(No Model.) 7 Sheets—Sheet 1.
F. LAMPLOUGH.
COMBINED WORKING PISTON AND VALVE GEAR.
No. 574,915. Patented Jan. 12, 1897.
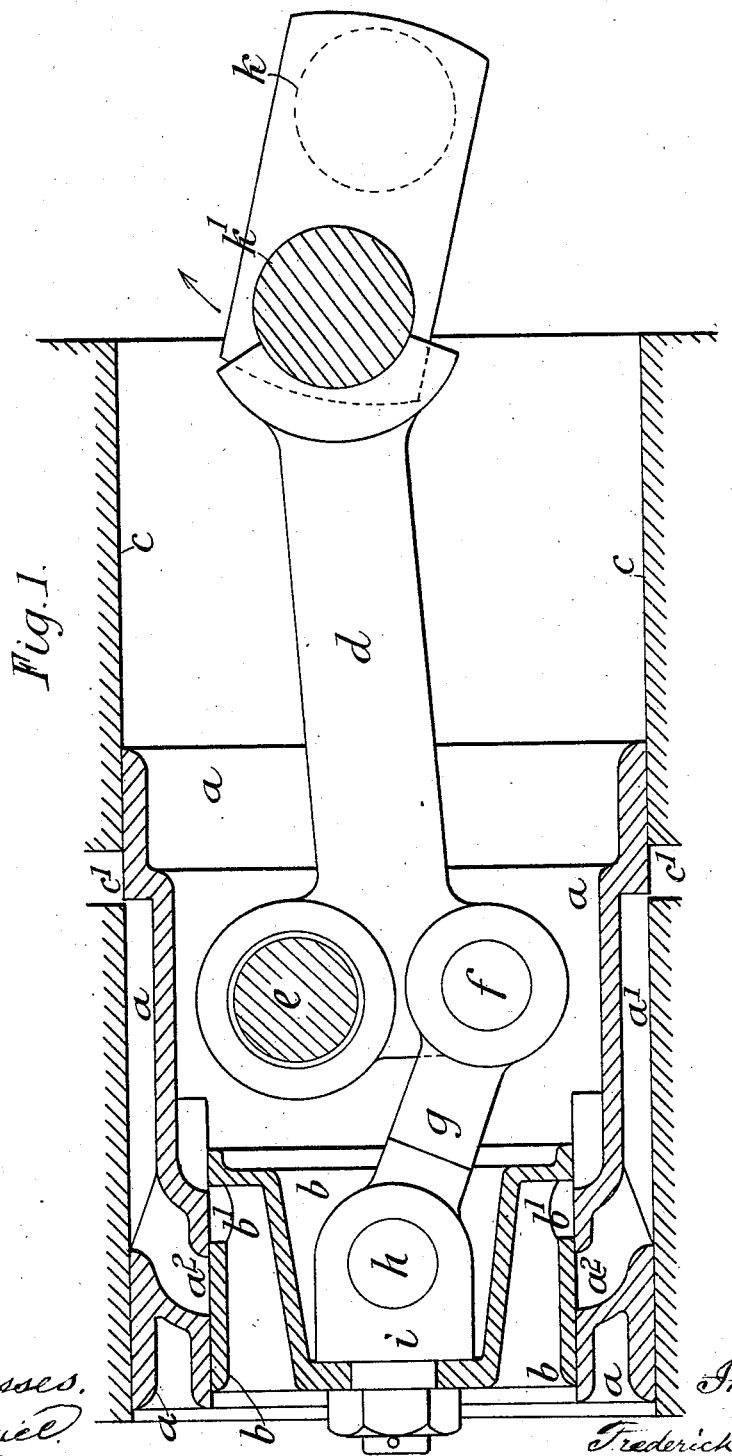
Witnesses.
Inventor.
Frederick Lamplough

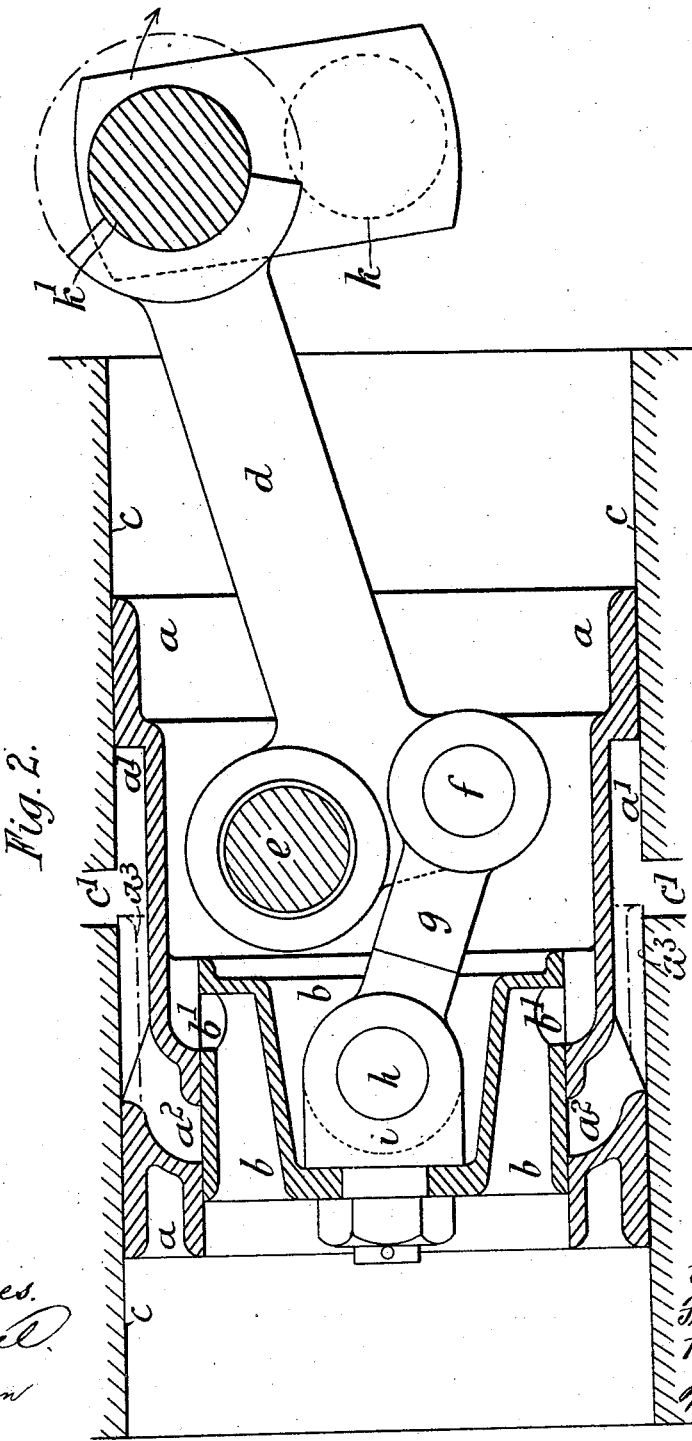

(No Model.) 7 Sheets—Sheet 3.
F. LAMPLOUGH.
COMBINED WORKING PISTON AND VALVE GEAR.
No. 574,915. Patented Jan. 12, 1897.
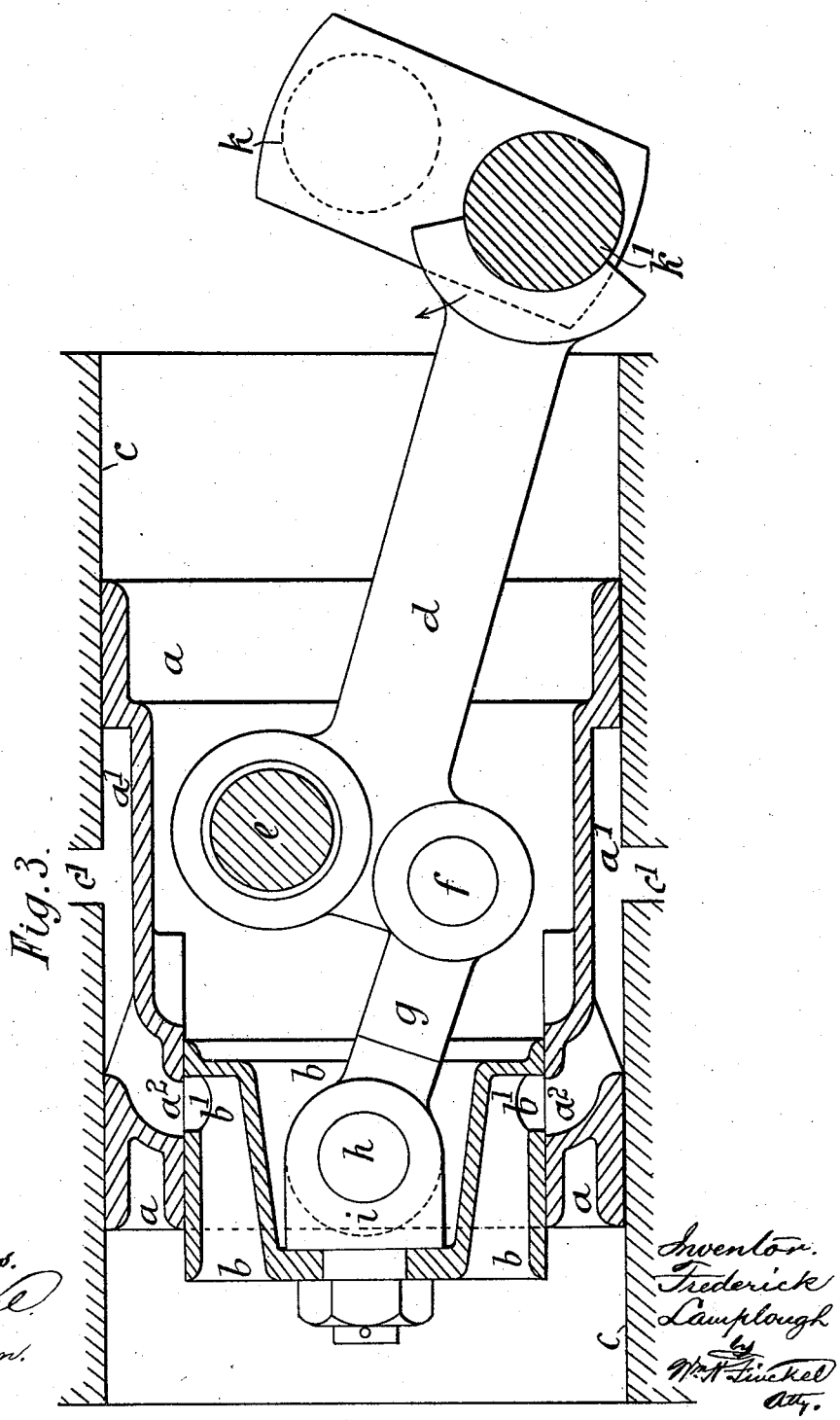

(No Model.) 7 Sheets—Sheet 4.
F. LAMPLOUGH.
COMBINED WORKING PISTON AND VALVE GEAR.

No. 574,915. Patented Jan. 12, 1897.

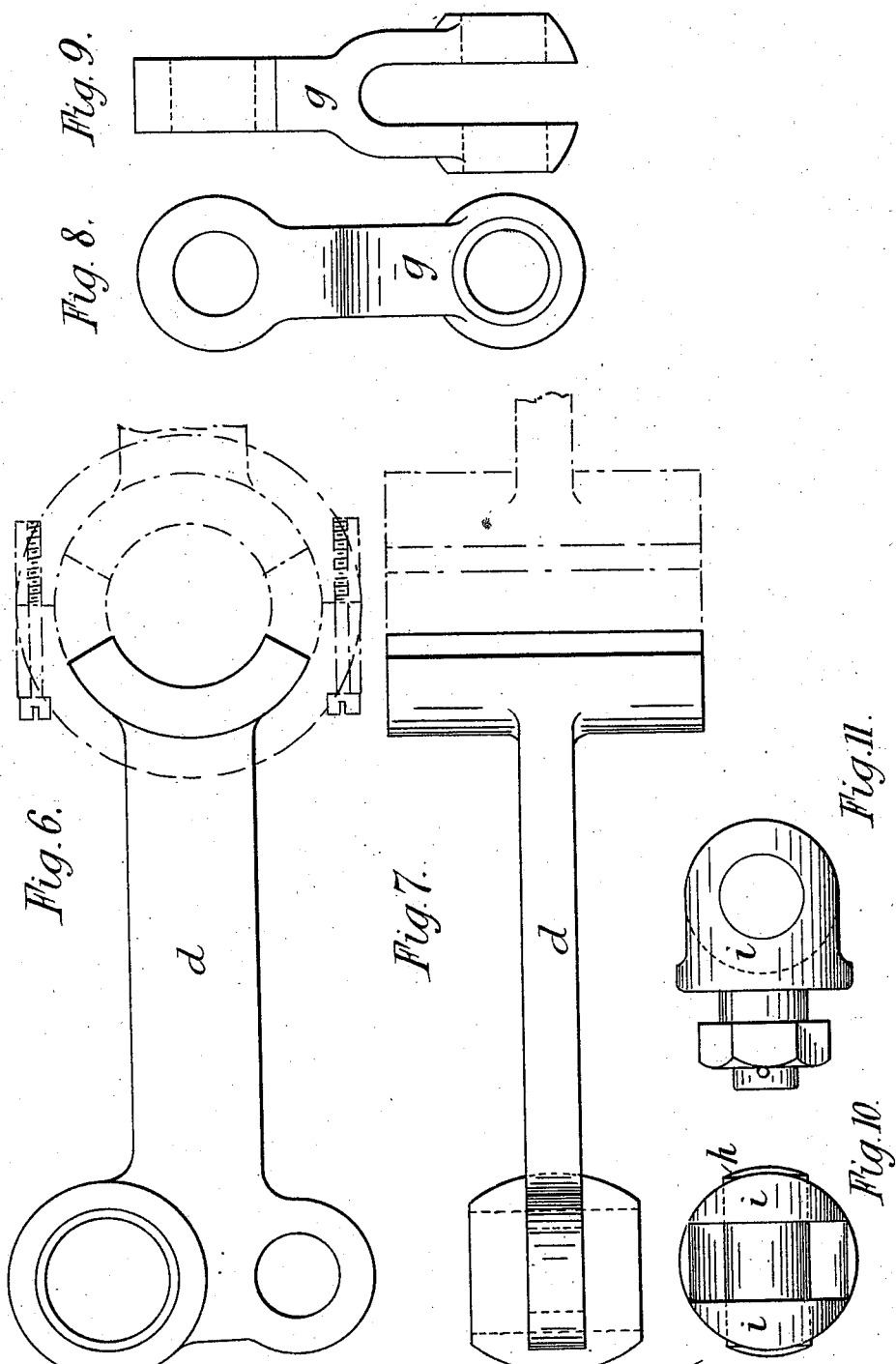

(No Model.) 7 Sheets—Sheet 6.
F. LAMPLOUGH.
COMBINED WORKING PISTON AND VALVE GEAR.
No. 574,915. Patented Jan. 12, 1897.
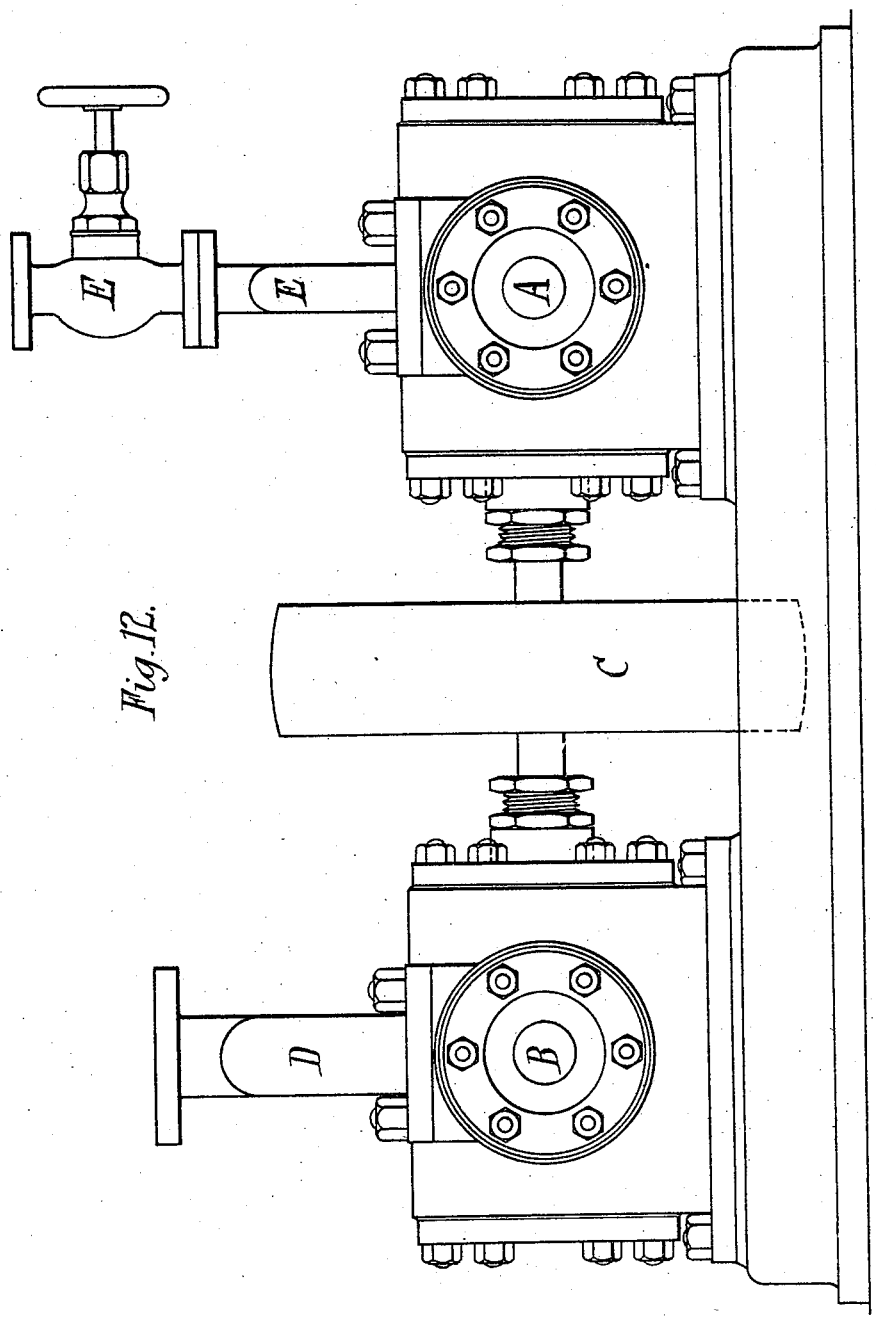

(No Model.) 7 Sheets—Sheet 7.
F. LAMPLOUGH.
COMBINED WORKING PISTON AND VALVE GEAR.
No. 574,915. Patented Jan. 12, 1897.
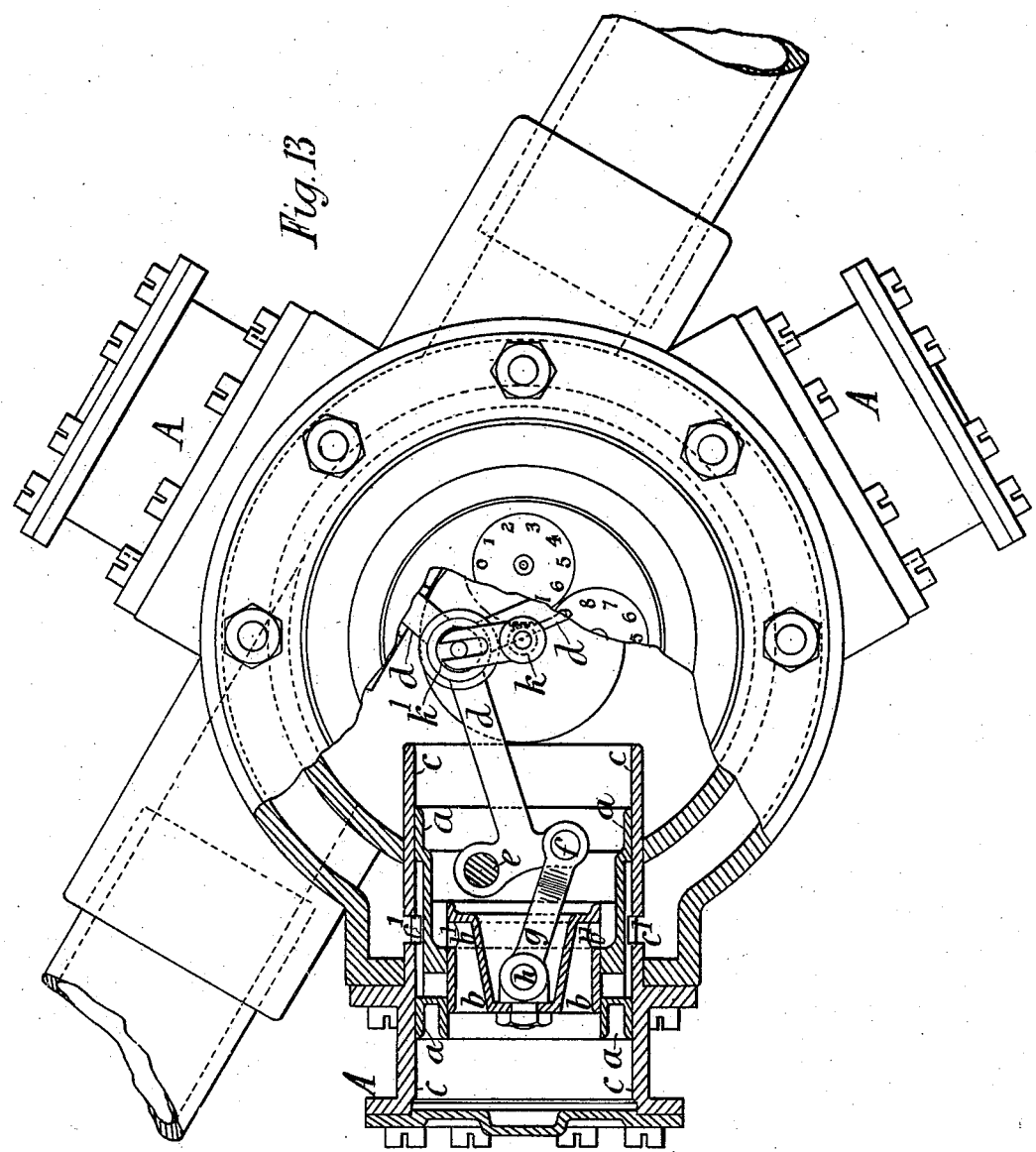

United States Patent Office.

FREDERICK LAMPLOUGH, OF GLEN RIDGE, NEW JERSEY, ASSIGNOR TO FREDERICK THOMAS GOODMAN, OF LONDON, ENGLAND.

COMBINED WORKING PISTON AND VALVE-GEAR.

SPECIFICATION forming part of Letters Patent No. 574,915, dated January 12, 1897.

Application filed June 15, 1896. Serial No. 595,556. (No model.)

*To all whom it may concern:*

Be it known that I, FREDERICK LAMPLOUGH, a citizen of the United States, residing at Glen Ridge, in the State of New Jersey, have invented certain new and useful Improvements in a Combined Working Piston and Valve-Gear, of which the following is a specification.

This invention relates to a combined working-piston and valve-gear arrangement for steam and other engines, water-meters, pumps, air-compressors, and the like, and has reference more particularly to a novel and simplified arrangement of parts whereby the working parts are reduced in number and a more precise action is obtained.

In carrying the invention into effect I adopt two concentric pistons, one within the other, to work in the interior of the pump or engine cylinder, according to the character of the apparatus. The two pistons are movably connected together by a lever and link and are coupled to the crank-pin of the driving-shaft by a single connecting-rod, on which the above-mentioned lever is formed in such manner that both pistons receive a to-and-fro motion in the interior of the cylinder. They at the same time perform a sliding motion relatively to each other. This relative sliding motion of the two pistons, in conjunction with suitably-arranged port-openings in both pistons and cylinder, effects a prompt inlet and cut-off.

In order that the invention may be clearly understood, I will first, by the aid of the accompanying drawings, describe the action of the improved arrangement in connection with a pump.

Figure 5:
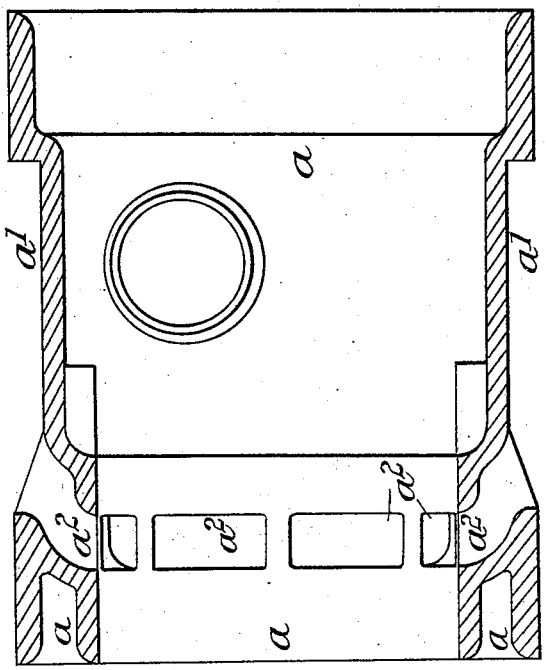
Figure 4:
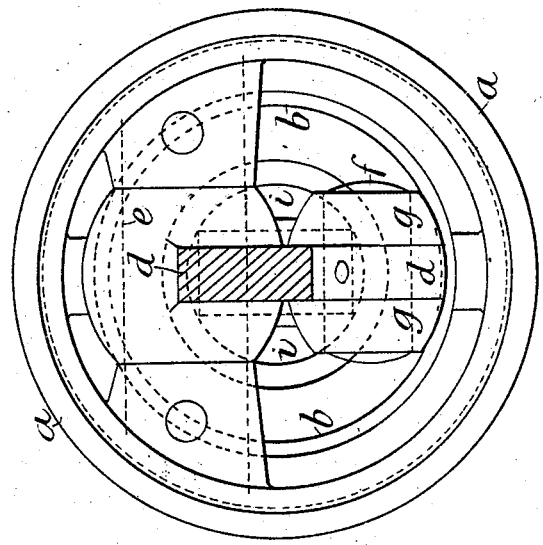

Figures 1, 2, and 3 show different positions of the pistons. Fig. 4 is an end view of the arrangement with the connecting-rod in section. Fig. 5 is a longitudinal vertical section through the outer piston. Figs. 6 to 11 show the connecting-rod and link connection in detail. Fig. 12 represents in elevation a pump worked directly by a steam-engine, both of which are supposed to be provided with the improved compound piston and connection. Fig. 13 shows the invention applied to a water-meter.

In all the figures like parts are indicated by the same letters of reference.

$a$ $b$ are the two valve-pistons, the outer one $a$ of which is fitted to slide in the interior of the cylinder $c$, the latter being indicated only by its interior walls, provided with a suitable port or opening $c'$. As will be seen, only the ends of the piston $a$ are made to fit the cylinder $c$, and an annular recess $a'$, of length equal to about the throw of the crank plus the port-opening, is provided around its periphery and leads to a number of ports $a^2$, which open into the interior of said piston $a$. The rear end of the piston $a$, containing the ports $a^2$, is of annular form, and the inner piston $b$ fits and works within the same, the end area of both pistons being alike for the purpose of equalizing the strains on their common connecting-rod. The inner piston $b$ is provided with a number of port-openings $b'$, corresponding with the ports $a^2$ in the outer piston $a$.

The end of the connecting-rod $d$ attached to the pistons is of T form and provided with two eyes. It is connected by a pin $e$ in one of said eyes to the outer piston $a$ and by a pin $f$ in the other eye to a forked link $g$, which latter is also pin-jointed at $h$ to the lug $i$, secured to the central piston $b$. The other end of the connecting-rod $d$ is connected with the crank-pin $k'$ of the crank of the driving-shaft $k$ in any suitable manner.

In describing the action of the pump the crank rotates in the direction of the arrow, Figs. 1, 2, and 3, and it will be easily understood from a comparison of Figs. 1 and 2 that in moving the piston and crank from the initial position shown at Fig. 1 to that represented at Fig. 2, or half-stroke, a partial vacuum has been formed between the pistons and the closed end of the cylinder, which, through the simultaneous opening of ports $b'$ into the central or crank chamber, causes a suction action and enables water from the latter to pass through the ports $b'$ into the space behind the pistons.

When the crank arrives at the dead-center on the outstroke, the central piston $b$ has moved relatively to the outer piston $a$, so as to interrupt communication between the ports $b'$ and the central chamber, and on the instroke they are gradually moved into the position shown at Fig. 3 and thereby open communication between the ports $a^2$ $b'$ and the port $c'$ in the cylinder $c$, or, in other words, between the water-chamber behind the pistons and the discharge-opening in the cylinder.

It need only be mentioned that the action of the pistons and the direction of movement of the crank in an air-compressor will be identical with that described in respect to pumps.

In steam and other engines or motors, as well as in a water-meter, the action and the movements will be reversed, and in these latter cases Fig. 3 would represent the outstroke, and the motor fluid would enter through the port $c'$ in the cylinder and through the open ports $a^2$ $b'$ behind the pistons $a$ and $b$. The latter, under the influence of the pressure exerted by the motor fluid, are driven outward and by their combined action on the connecting-rod $d$ compel the crank and driving-shaft $k$ to rotate. As will be noticed, the impulse takes place during the outstroke only and exhaust during the return stroke of the pistons.

When it is desired to obtain a cut-off at any point before the end of the outstroke of the pistons, the rear part of the outer piston $a$ is prolonged over the ports $a^2$ to the required length, as indicated by broken lines $a^3$, Fig. 2. As the cut-off takes place through the motion of the outer piston, it will be obvious that the action will be much sharper and quicker than that of the ordinary slide-valve, especially so where the cut-off is arranged to take place at half-stroke when the piston is at its greatest velocity.

In the arrangement shown at Fig. 12, A represents the steam-engine, and B the pump, connected by a common driving-shaft, on which is fixed a fly-wheel C. D represents the delivery-pipe of the pump, and E the inlet-pipe and starting-valve for the steam-engine.

Although a single cylinder may be employed, it will in most cases be more advantageous to have two or more cylinders A, each provided with compound pistons $ab$, arranged to act on a common crank, as indicated at Fig. 13, which arrangements are well known and require no detailed description.

I would have it understood that, without departing from the nature of the invention, I may in some cases have to vary the details of the same.

Having fully described my invention, what I desire to claim and secure by Letters Patent is—

1. A combined piston and valve-gear, consisting of two concentric pistons of equal end area, one working within the other, and provided with port-holes adapted to serve either as inlet or exhaust, a connecting-rod having a T-shaped end to which the said pistons are pin-jointed thereby to equalize the strains from the piston on the latter and direct them through the central line thereof, and a cylinder open at one end and adapted to receive such pistons, substantially as shown and described.

2. The combination with a cylinder open at one end, of a combined piston and valve-gear arranged and working in such cylinder, and consisting of two concentric pistons, operated by a single connecting-rod, one piston working within the other, and provided with port-holes adapted to act as inlet or exhaust through an annular space or recess in the periphery of the outer piston of a length equal to about the throw of the crank plus the port-opening in the cylinder, substantially as and for the purpose described.

3. The combination with a cylinder open at one end, of a combined piston and valve-gear, arranged and working in said cylinder, and consisting of two concentric pistons operated by a single connecting-rod, and one working within the other, the outer piston being provided with an annular recess on its periphery equal to about the throw of the crank plus the port-opening, and with port-holes leading from the annular recess into the reduced part in the interior of said outer piston, and the smaller or central piston fitting and sliding in the reduced part of the outer piston, and provided with port-holes adapted to register with the port-holes of said outer piston, a connecting-rod having a T-shaped end, and the said outer piston being directly pin-jointed to one eye of the said T-shaped end of the said connecting-rod, and the smaller central piston being connected by a link to the other eye of the T-shaped end of said connecting-rod, substantially as herein described.

4. The combination with a cylinder open at one end, of a combined piston and valve-gear, arranged and working in said cylinder, and consisting of two concentric pistons, one working within the other, and provided with registering port-holes, a single connecting-rod provided with a T-shaped head having eyes equidistant from the center line of said rod and adapted to be firmly secured by a cross-pin directly to one of said combined pistons and valves and by a link to the other combined piston and valve for the purposes of directing the strains thereon through its center line, and of producing a relative sliding movement between the two pistons and valves as well as an advancing or return motion thereof in the interior of the cylinder, substantially as described.

FREDERICK LAMPLOUGH.

Witnesses:
JOHN ALEX. OLLARD,
CLAUDE K. MILLS.